US009653743B2

United States Patent
Ahn et al.

(10) Patent No.: US 9,653,743 B2
(45) Date of Patent: May 16, 2017

(54) METHOD AND APPARATUS FOR DETECTING DEFECTS OF FUEL CELL MEMBRANE-ELECTRODE ASSEMBLY

(71) Applicant: Hyundai Motor Company, Seoul (KR)

(72) Inventors: Sang Yeoul Ahn, Seoul (KR); Tae Won Lim, Seoul (KR); Byung Ki Ahn, Gyeonggi-Do (KR); Hyun Seung Lee, Seoul (KR); Yong Sun Park, Gyeonggi-Do (KR); Sung Keun Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 14/550,926

(22) Filed: Nov. 22, 2014

(65) Prior Publication Data

US 2016/0013500 A1   Jan. 14, 2016

(30) Foreign Application Priority Data

Jul. 9, 2014 (KR) .................. 10-2014-0086295

(51) Int. Cl.
*H01M 8/04* (2016.01)
*H01M 8/04664* (2016.01)
*H01M 8/0438* (2016.01)
*H01M 8/04746* (2016.01)
*H01M 8/1018* (2016.01)

(52) U.S. Cl.
CPC ... *H01M 8/04671* (2013.01); *H01M 8/04432* (2013.01); *H01M 8/04783* (2013.01); *H01M 2008/1095* (2013.01)

(58) Field of Classification Search
CPC ..... H01M 2008/1095; H01M 8/04432; H01M 8/04671; H01M 8/04783
See application file for complete search history.

(56) References Cited

FOREIGN PATENT DOCUMENTS

| JP | S56-129003 A | 10/1981 |
|---|---|---|
| JP | 2004-214089 A | 7/2004 |
| JP | 2005-142062 A | 6/2005 |
| JP | 2005-201848 A | 7/2005 |
| JP | 2005181013 A | 7/2005 |
| KR | 10-1989-0008562 | 7/1989 |
| KR | 10-2010-0041748 | 4/2010 |
| KR | 10-2010-0131869 A | 12/2010 |
| KR | 10-2011-0000157 A | 1/2011 |

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

Disclosed herein is a method of detecting defects of a fuel cell membrane-electrode assembly which comprises a gas diffusion layer, a catalyst layer and an electrolyte membrane. The method includes steps of: supplying gas to a first side of the membrane-electrode assembly; deducing a pressure of the supplied gas and a permeation rate of the gas permeating to a second side of the membrane-electrode assembly and then deducing an interface pressure between the electrolyte membrane and the gas diffusion layer of the membrane-electrode assembly using the deduced pressure of the supplied gas and the permeation rate; calculating a gas permeability of the electrolyte membrane using the deduced values of the pressure of the supplied gas and the permeation rate and a predetermined outlet pressure at the second side of the membrane-electrode assembly; and determining a defect state of the electrolyte membrane using a variation in the calculated gas permeability according to a change in the pressure of the supplied gas.

17 Claims, 4 Drawing Sheets

METHOD AND APPARATUS FOR DETECTING DEFECTS OF FUEL CELL MEMBRANE-ELECTRODE ASSEMBLY

CROSS REFERENCE TO RELATED APPLICATION

The present application claims priority to Korean Patent Application No. 10-2014-0086295, filed Jul. 9, 2014, the entire contents of which is incorporated herein for all purposes by this reference.

TECHNICAL FIELD

The present invention relates to a method and apparatus for detecting the defects of a fuel cell membrane-electrode assembly. Particularly, the present invention relates to the method and apparatus for detecting the defects of a fuel cell membrane-electrode assembly by determining occurrence or degree of defects of an electrolyte membrane of the membrane-electrode assembly.

BACKGROUND

A fuel cell vehicle is driven by the electricity, which is generated by supplying hydrogen fuel stored in a hydrogen storage tank and oxygen in the atmosphere respectively to an anode and a cathode of a membrane-electrode assembly (MEA) of a fuel cell stack and inducing an electrochemical reaction including oxidation and reduction.

When used in an engine of the fuel cell vehicle, the production yield of the fuel cell stack may be required to increase. As such, the fuel cell stack may be produced by a process including the steps of: a step of attaching gas diffusion layers (GDL) to both sides of the membrane-electrode assembly by thermal pressing or using an adhesive; and alternately stacking and connecting several hundreds of these membrane-electrode assemblies with separating plates. The functions of each essential component necessary for constructing the fuel cell stack are as follows. The membrane-electrode assembly includes: the anode and the cathode each of which contains a carbon-supported platinum catalyst; and an electrolyte membrane made of a fluorine-sulfonic acid copolymer which produces electricity through electrochemical reactions such as oxidation and reduction reactions. The gas diffusion layer (GDL) may be a water-repellent double layer made of carbon fiber and carbon powder and supports the membrane-electrode assembly, controls the moving routes of gas and water, and transmits the electrons generated from the membrane-electrode assembly. The separating plate may be a waterproof plate made of a metal matrix provided with flow channels and the separating plate supports the membrane-electrode assembly and the gas diffusion layer, thereby providing the moving routes of reaction gases and water and transferring electrons from the gas diffusion layer to a collector plate.

Among the essential components necessary for constructing a fuel cell stack, the quality of the anode catalyst, the cathode catalyst and the polymer electrolyte membrane of the membrane-electrode assembly may influence substantially on the output and durability of the fuel cell stack. Particularly, the quality of the fuel cell stack may be reduced by structural defects such as pinholes, damages, splits of the polymer electrolyte membrane. Furthermore, the structural defects may further cause damage by fire, i.e. combustion reaction, due to the direct chemical reaction of oxygen and hydrogen, thereby causing a risk of a fire occurring in the fuel cell stack, rather than the electric power generation of the fuel cell stack by the electrochemical reaction of the hydrogen fuel and the oxygen oxidant.

Typically, in order to determine occurrence and state of defects of the electrolyte membrane in the membrane-electrode assembly, a gas permeation rate (unit: mL/min) of specific gas to the membrane-electrode assembly (MEA), or alternatively crossover value, was measured, and then the occurrence and state of defects thereof are determined based on the lower and upper limits of a reference value. In particularly, for the fuel cell membrane-electrode assembly, large pores ($1.0 \times 10^{-2}$~$5.0 \times 10^{2}$ μm) of the platinum (Pt) catalyst and the gas diffusion layer (GDL) and ultrafine pores ($<1.0 \times 10^{-3}$ μm) of the electrolyte membrane may simultaneously exist. As such, the inert gas which is not adsorbed on the wall of pores in the electrolyte membrane may move by viscous flow based on Poiseuille's law and by Knudsen flow based on free molecule flow according to pore size, such that the degree of discrimination of the occurrence and state of defects thereof is very low.

Further, the occurrence and state of defects of the electrolyte membrane may be determined by measuring open circuit voltage (OCV: current vs. voltage) which is an electrochemical measurement method or by measuring the difference in voltage under the predetermined current density. However, this method may not be appropriate such that micrometer-sized pinholes formed in the MEA having a microporous structure and predetermined gas permeability may be discriminated significantly.

Furthermore, the existence and reproducibility of pinholes in the unit cell prepared by thermally pressing of the electrolyte membrane and in the gas diffusion layer (GDL) may be typically observed by scanning electron microscope (SEM) or transmission electron microscope (TEM). However, although those have been used in a primary detection, such microscopic method may not be suitable for detecting the defects over the entire surface of the electrolyte membrane since the electronic microscopes may be limited to the local region or microregion of the electrolyte membrane. Further, the electrolyte membrane after this method may not be reused since the electron microscopic methods are destructive.

In the related arts, in addition to the above-mentioned methods of detecting defects using the gas permeation characteristics or electrochemical characteristic of the MEA, other methods of detecting defects using optical properties and electrochemical characteristics have also been used. However, defects over the entire region of the electrolyte membrane in the membrane-electrode assembly may not be detected since those methods may detect only the localized region of the membrane-electrode assembly or may not discriminate micropinholes, such that those methods may not be suitable as well.

It is to be understood that the foregoing description is provided to merely aid the understanding of the present invention, and does not mean that the present invention falls under the purview of the related art which was already known to those skilled in the art.

SUMMARY OF THE INVENTION

Accordingly, the present invention provides technical solutions to the above-mentioned technical difficulties and provides a method and apparatus for detecting defects of a fuel cell membrane-electrode assembly. The method and the apparatus may detect the structural defects, such as pinholes, damages, splits and the like, in a polymer electrolyte membrane of the membrane-electrode assembly in a fuel cell stack by using a single-component inert gas permeation model. In particular, macropinholes and micropinholes, which may not be detected by visible observation methods such as gas permeability measurement, electrochemical measurement, observation with the naked eye and an optical system, may be distinguished by a nondestructive method using gas permeability, and then the examined electrolyte membrane may be supplied to a manufacturing line to produce the fuel cell stack, thereby improving an output performance and durability of the fuel cell stack.

In one aspect, the present invention provides a method of detecting the defects of a fuel cell membrane-electrode assembly. In an exemplary embodiment, a membrane-electrode assembly may be a five-layered membrane-electrode assembly (MEA), which may include a three-layered electrolyte membrane and pure gas diffusion layers (GDLs) attached to both sides of the three-layered membrane-electrode assembly.

In an exemplary embodiment, the method may include steps of:

a step of supplying single-component inert gas to a first side or a high-pressure portion of a gas diffusion layer containing a platinum catalyst layer at a stepwisely increasing supply pressure greater than an atmospheric pressure;

a step of deducing a gas permeation rate (F, mol/m²·s) and a gas permeability (q, mol/m²·s·Pa) of the gas permeating to a second side or a low-pressure portion of the gas diffusion layer at a cathode-side which includes the cathode platinum catalyst layer which is also referred to a pure gas diffusion layer and then penetrating the platinum catalyst layer attached to the pure gas diffusion layer, and experimentally deducing a Knudsen flow permeation coefficient ($\alpha$) and a viscous flow permeation coefficient ($\beta$) of single-component inert gas from an intercept and a slope of a straight line when obtained gas permeability data at the average pressure of high-pressure portion and low-pressure portion with respect to each pressure of supplied gas are developed by the Equation $q=\alpha+\beta \times P_{av}$;

a step of theoretically deducing the Knudsen flow permeation coefficient ($\alpha$) and the viscous flow permeation coefficient ($\beta$) by defined Equations and then comparing the theoretically deduced Knudsen flow permeation coefficient ($\alpha$) and a viscous flow permeation coefficient ($\beta$) with the experimentally deduced Knudsen flow permeation coefficient ($\alpha$) and a viscous flow permeation coefficient ($\beta$);

a step of sequentially supplying single-component inert gas to the first side or the cathode side of the five-layered membrane-electrode assembly at a predetermined pressure of atmospheric pressure or greater by gradually increasing and measuring a gas permeation rate (F, mol/m²·s) on the second side or an anode side of the five-layered membrane-electrode assembly;

deducing an interface pressure ($P_m$) between the electrolyte membrane and the gas diffusion layer of the five-layered membrane-electrode assembly using the gas permeation rate (F) at the average pressure of both side pressures ($P_h$, $P_l$) measured on the second side of the five-layered membrane-electrode assembly according to the above-deduced Knudsen flow permeation coefficient ($\alpha$) and viscous flow permeation coefficient ($\beta$) of single-component inert gas with respect to the gas diffusion layer including a platinum catalyst layer and the stepwisely increasing pressure ($P_h$) of the supplied gas to the high-pressure portion, while the gas diffusion layer at the anode-side including an anode catalyst layer for detecting the gas permeation rate is disregarded in a modified gas permeation model where viscous flow characteristics may generated through pores ($1.0 \times 10^{-2} \sim 5.0 \times 10^2$ μm) greater than ultrafine pores ($<1.0 \times 10^{-3}$ μm) in the electrolyte membrane;

calculating the gas permeability of the pure electrolyte membrane using the gas permeation rates (F, mol/m²·s) at the average pressure of high-pressure portion and the low-pressure portion measured by the difference between the pressure ($P_m$) at the interface between the electrolyte membrane and the cathode platinum catalyst layer including the gas diffusion layer at the cathode-side and the predetermined outlet pressure ($P_l$) at the second side of the five-layered membrane-electrode assembly; and determining a defect state of the electrolyte membrane using the variation in the calculated gas permeability ($q_{pem}$) of only the pure electrolyte membrane with respect to the average pressure of the low-pressure portion of the anode side and the high-pressure portion at the cathode side in the membrane-electrode assembly according to the change in pressure between the cathode platinum catalyst layer and the electrolyte membrane.

The permeability (q, mol/m·s·Pa) of single-component inert gas may be determined by the following Equation:

$$q=\alpha+\beta \times P_{av}$$

where $\alpha$ is a Knudsen flow permeation coefficient, $\beta$ is a viscous flow permeation coefficient, $P_{av}$ is an average pressure which is an arithmetic average of the high-pressure portion pressure and the low-pressure portion pressure.

In the deduction step, the Knudsen flow permeation coefficient ($\alpha$) and the viscous flow permeation coefficient ($\beta$) may be obtained from the intercept and slope of the straight line, when the gas permeability data at the average pressure of the high-pressure portion and the low-pressure portion in the gas diffusion layer containing the catalyst layer, particularly, the cathode catalyst layer, is developed according to the Equation $q=\alpha+\beta \times P_{av}$.

Further, the Knudsen flow permeation coefficient ($\alpha$) of the gas diffusion layer may be represented by the following Equation:

$$\alpha = \frac{[8r]}{[3L(2\pi MRT)^{1/2}]} \frac{\varepsilon}{k_t}$$

where r is an average pore radius having a unit in meter; L is a thickness of the electrolyte membrane having a unit in meter; μ is a viscosity of the permeated gas having a unit in N·s/m²], R is a gas constant of about 8.314 J/mol·k; T is a measured temperature having a unit in K; M is a molecular weight of permeated gas having a unit in kg/mol; $\varepsilon$ is a porosity of gas diffusion layer; $k_t$ is a flexibility constant of the pores of the gas diffusion layer.

In addition, the viscous flow permeation coefficient ($\beta$) of the gas diffusion layer may be determined by the following Equation:

$$\beta = \frac{[r^2]}{[8L\mu RT]} \frac{\varepsilon}{k_t}$$

where r is an average pore radius having a unit in meter; L is a thickness of the electrolyte membrane having a unit in meter; μ is a viscosity of the permeated gas having a unit in N·s/m², R is a gas constant of about 8.314 J/mol·k; T is a measured temperature having a unit in K; M is a molecular weight of permeated gas having a unit in kg/mol; $\varepsilon$ is a porosity of gas diffusion layer; $k_t$ is a flexibility constant of the pores of the gas diffusion layer.

Further, in the deduction step, the average pressure ($P_{av}$) may be determined by the following Equation:

$$P_{av} = \frac{P_h + P_l}{2}$$

where $P_h$ is a pressure at a high-temperature portion when single-component inert gas is permeated [Pa], and $P_l$ is a pressure at a low-temperature portion when single-component inert gas is permeated [Pa].

Further, in the deduction step, the interface pressure (Pm) of the electrolyte membrane may be determined by the following Equation:

$$P_m = \{(\alpha_{Ca\,Pt+GDL}/\beta_{Ca\,Pt+GDL})^2 + 2P_h(\alpha_{Ca\,Pt+GDL}/\beta_{Ca\,Pt+GDL}) + P_h^2 - 2F/\beta_{Ca\,Pt+GDL}\}^{1/2} - \alpha_{Ca\,Pt+GDL}/\beta_{Ca\,Pt+GDL}$$

wherein $\alpha_{Ca.Pt+GDL}$ is the Knudsen flow permeation coefficient of the gas diffusion layer including the catalyst layer, $\beta_{Ca.Pt+GDL}$ is the viscous flow permeation coefficient of the gas diffusion layer including the catalyst layer, $P_h$ is the pressure of the supplied gas at the high-pressure portion, and F is the gas permeation rate [mol/m²·s] at the average pressure $P_{av}$.

After the pressure $P_m$ at the interface of the electrolyte membrane is obtained, the permeability of gas only in the polymer electrolyte membrane (PEM) may be obtained by the following Equation:

$$q_{pem} = \frac{F}{P_m - P_l}$$

Meanwhile, in the deduction step, the gas permeation rate (F) may be detected by a detection unit. In the calculation step, the gas permeability ($q_{pem}$) may be calculated by dividing the deduced gas permeation rate by the difference between the interface pressure and the outlet pressure.

In the determination step, as the pressure of the supplied single-component inert gas increases, when the calculation result of gas permeability ($q_{pem}$) to average pressure ($P_{av} = (P_m + P_l)/2$) is irrelevant to pressure, or alternatively, when q is about 0 or less than $1.0 \times E^{-10}$, gas migration may not occur due to viscous flow, such that only micropores may exist to a degree that only Knudsen flow may occur but cracks may not exist. Accordingly, a state of the electrolyte membrane may be determined as a normal state which has no defect.

Further, in the determination step, as the supply pressure of the single-component inert gas increases, when the gas permeability ($q_{pem}$) of the electrolyte membrane which is obtained by the above Equation increases depending on the measured pressure, defects such as pinholes may exist in the electrolyte membrane, and thus most of the gas may move through defective portions such as pinholes. Consequently, with the increase of the pressure of the supplied gas ($P_h$), the interface pressure ($P_m$) may be substantially reduced to such a degree that the interface pressure ($P_m$) may be about equal to the outlet pressure ($P_l$), and thus $P_m - P_l$ may be approximately zero. However, on the other hand, the gas permeation rate (F) may rapidly increase by a viscous flow effect in contrast to the case when the electrolyte membrane has no defect, and thus it can be determined that cracks greater than microcracks may be formed in the electrolyte membrane.

Further, in the determination step, as the supply pressure of single-component inert gas increases, when the gas permeability ($q_{pem}$) of the electrolyte membrane which is calculated by Equation 6 decreases depending on the measured pressure, defects may be substantially little, and thus the increase of F may be less than the rapid increase of pressure difference ($P_m - P_l$) depending on the increase of the measured pressure ($P_h$), unlike in Equation 6. Therefore, microcracks may be formed in the electrolyte membrane when the calculated gas permeability decreases.

In another aspect, the present invention provides an apparatus for detecting defects of a five-layered membrane-electrode assembly including a three-layered membrane-electrode assembly and gas diffusion layers attached to both sides of the three-layered membrane-electrode assembly. The apparatus may include: a pressing unit supplying gas to a first side of the five-layered membrane-electrode assembly; a detection unit detecting the permeation rate of the gas permeating to a second side of the five-layered membrane-electrode assembly; and a control unit calculating an interface pressure between the electrolyte membrane of the three-layered membrane-electrode assembly and a catalyst layer-gas diffusion layer laminate including the catalyst layers of the three-layered membrane-electrode assembly using the pressure of the gas supplied by the pressing unit and the gas permeation rate detected by the detection unit, calculating the gas permeability of the electrolyte membrane using a predetermined outlet pressure at the second side of the five-layered membrane-electrode assembly, the detected gas permeation rate and the calculated interface pressure, and determining the defect state of the electrolyte membrane using the variation in the calculated gas permeability according to a change in the pressure of the supplied gas.

The gas may be an inert gas such as nitrogen which does not react with other substances, and the gas may further be, but not limited to, helium and the other noble gas belonging to group 18 elements on the periodic table. A plurality of the pressing units may be provided, and the plurality of the pressing units may supply gas at various predetermined pressure.

Further, the control unit may adopt the gas permeability value reaching a normal state for a predetermined time after the pressure of the supplied gas is changed, and may use the adopted gas permeability value as a factor for identifying the severe defects of the electrolyte membrane by plotting the gas permeability of the electrolyte membrane with respect to the average pressure of the interface pressure and the outlet pressure of the electrolyte membrane in the membrane-electrode assembly.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the attached drawings.

Figure 1:
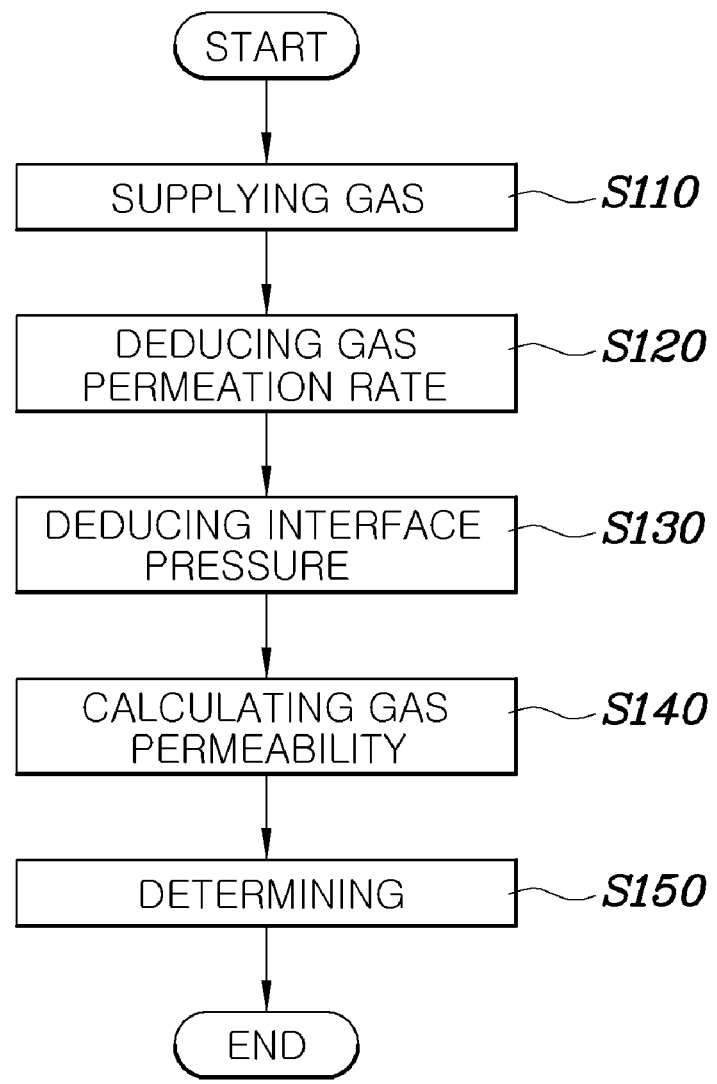
FIG. 1 shows an exemplary method of detecting defects of an exemplary fuel cell membrane-electrode assembly according to an exemplary embodiment of the present invention.
Figure 2:
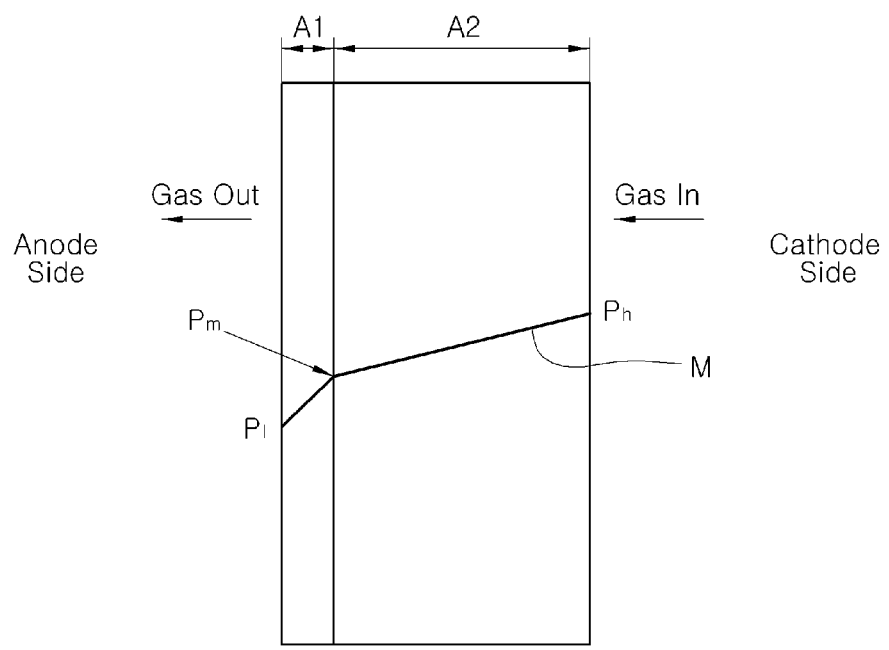
FIG. 2 schematically shows an exemplary flow of gas supplied to an exemplary fuel cell membrane-electrode assembly according to an exemplary embodiment of the present invention.
Figure 3:
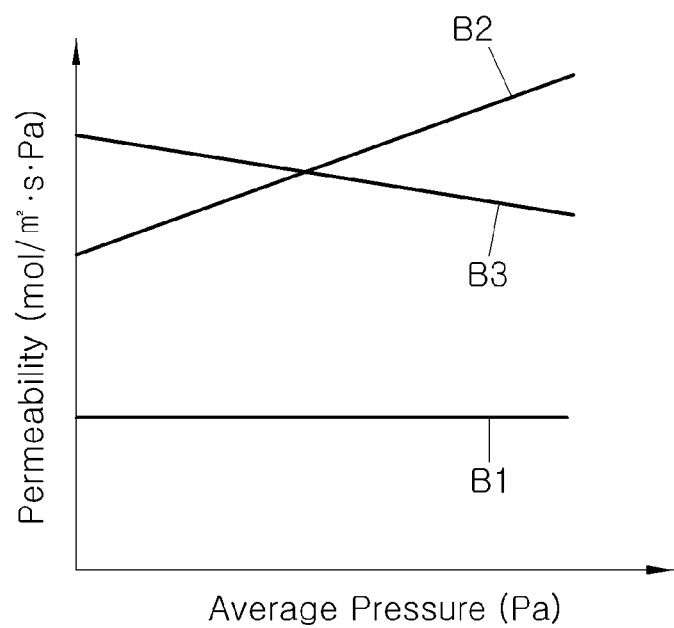
FIG. 3 shows an exemplary relationship between an average pressure and a gas permeability when an exemplary electrolyte membrane is cracked according to an exemplary embodiment of the present invention.
Figure 4:
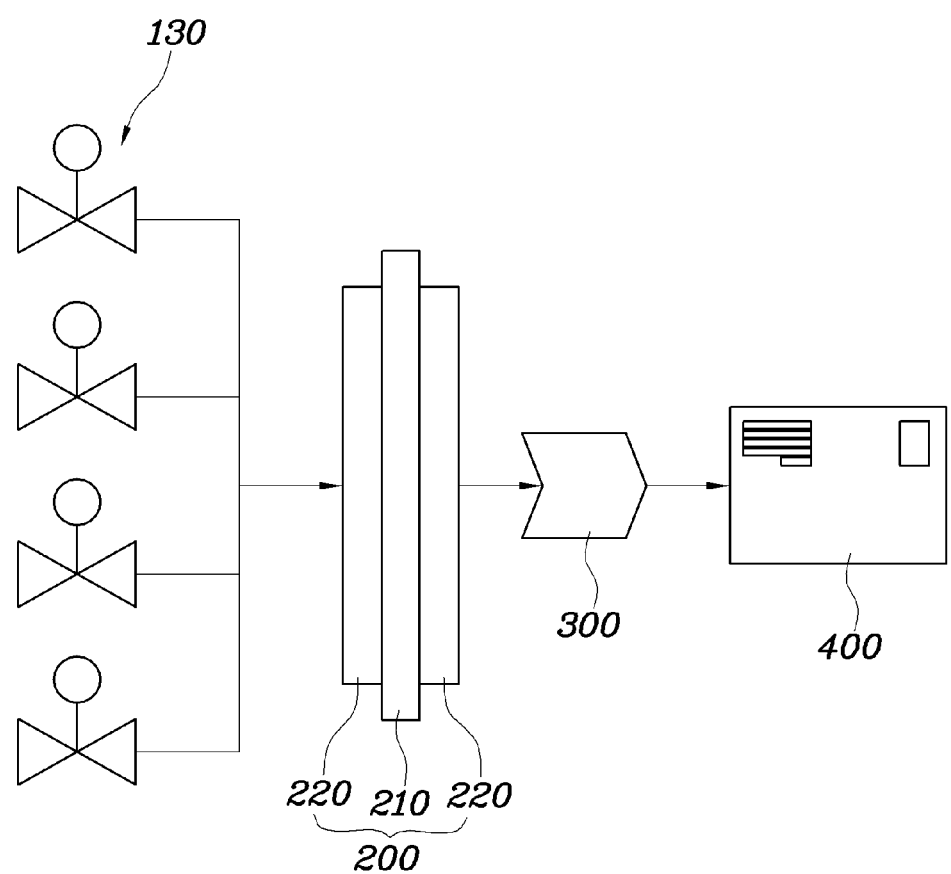
FIG. 4 schematically shows an exemplary apparatus for detecting defects of an exemplary fuel cell membrane-electrode assembly according to an exemplary embodiment of the present invention.

FIG. 1 shows an exemplary method of detecting the defects of a fuel cell membrane-electrode assembly according to an exemplary embodiment of the present invention, FIG. 2 schematically shows an exemplary flow of gas supplied to an exemplary fuel cell membrane-electrode assembly according to an exemplary embodiment of the present invention, FIG. 3 is a graph showing an exemplary relationship between an average pressure and a gas permeability when an electrolyte membrane is cracked, and FIG. 4 schematically shows an exemplary apparatus for detecting defects of an exemplary fuel cell membrane-electrode assembly according to an exemplary embodiment of the present invention.

As shown in FIG. 1, an exemplary method of detecting defects of an exemplary fuel cell membrane-electrode assembly according to an exemplary embodiment of the present invention is provided. The membrane-electrode assembly may be a five-layered membrane-electrode assembly (MEA) including a three-layered membrane-electrode assembly and gas diffusion layers (GDLs) attached to both sides of the three-layered membrane-electrode assembly. The method may include steps of: a step of supplying gas to a first side of the five-layered membrane-electrode assembly (S110); a step of deducing a pressure of the gas supplied in S110 and a permeation rate of gas permeating to a second side of the five-layered membrane-electrode assembly (S120); a step of deducing an interface pressure between the electrolyte membrane of the five-layered membrane-electrode assembly and a catalyst layer-gas diffusion layer laminate including a fuel cell catalyst layer, particularly, a cathode catalyst layer (S130); a step of calculating a gas permeability of the electrolyte membrane using the values deduced in S120 and S130 and a predetermined outlet pressure at the second side of the five-layered membrane-electrode assembly (S140); and a step of determining a defect state of the electrolyte membrane using variation in the calculated gas permeability according to a change in the pressure of the supplied gas by plotting the gas permeability calculated in S140 with respect to the average pressure of the interface pressure of the electrolyte membrane and the outlet pressure of the five-layered membrane-electrode assembly as the pressure of the supplied single-component inert gas is changed (S150).

As shown in FIG. 2, the first side of the five-layered membrane-electrode assembly may be an outer side exposed to the outside of the gas diffusion layer; the catalyst layer may be disposed between the electrolyte membrane (A1) and the gas diffusion layer; both sides of the catalyst layer may face to the electrolyte membrane (A1) and the gas diffusion layer, respectively; and one side of the electrolyte membrane (A1) faces the catalyst layer.

In particular, in the five-layered membrane-electrode assembly, the anode-sided gas diffusion layer and an anode catalyst may be disregarded. The anode-sided gas diffusion layer and the anode catalyst may have greater pores than those of the electrolyte membrane such that the gas penetrating the anode-sided gas diffusion layer and the anode catalyst may have viscous flow characteristics. Therefore, the second side of the five-layered membrane-electrode assembly may be the equivalent as the second side of the electrolyte membrane (A1). As such, the gas diffusion layer of the anode side and the anode catalyst may be disregarded.

In step 110 (S110), the gas may be supplied to the outer side of the gas diffusion layer which is the outer side of the gas diffusion of the cathode side, and thus the gas may be transferred in a direction from the gas diffusion layer toward the electrolyte membrane, or alternatively, from the cathode side to the anode side.

Meanwhile, an exemplary five-layered membrane-electrode assembly, as described above, may include a catalyst layer making contact with the electrolyte membrane (A1), and the catalyst layer may be disposed between the electrolyte membrane (A1) and the gas diffusion layer. The electrolyte membrane (A1) and the gas diffusion layer may have pore sizes different from each other, and the catalyst layer and the gas diffusion layer may have substantially similar pore sizes of about $1.0\times10^{-2}$~$5.0\times10^{2}$ μm. The pores formed in the gas diffusion layer and the catalyst layer may be of about $1.0\times10^{-3}$ μm and greater than the pores formed in the electrolyte membrane (A1). In addition, the gas supplied in step 110 (S110) may be supplied at predetermined pressure, and thus the pressure of the supplied gas may be differentiated from the interface pressure which is the pressure on the interface between the electrolyte membrane (A1) and a catalyst and the outlet pressure.

As shown in the pressure curve (M) of FIG. 2, when the supplied gas passes through the large pores of the gas diffusion layer, pressure may not change substantially, but the gas may not be easily transmitted at the interface between the electrolyte membrane (A1) and the catalyst layer compared to the gas diffusion layer. Therefore, pressure at the interface may increase substantially.

Moreover, the outlet pressure may be set to a predetermined pressure value, for example, atmospheric pressure, however, the outlet pressure may be changed without being limited thereto. In steps 120 and 130 (S120 and S130), the outlet pressure may be detected by a detection unit, for example, a mass flow meter (MFM) or a pressure sensor.

Meanwhile, in steps 120 and 130 (S120 and S130), the interface pressure ($P_m$) may be calculated by the following Equation 1:

$$P_m = \{(\alpha_{Ca.Pt+GDL}/\beta_{Ca.Pt+GDL})^2 + 2P_h(\alpha_{Ca.Pt+GDL}/\beta_{Ca.Pt+GDL}) + P_h^2 - 2F/\beta_{Ca.Pt+GDL}\}^{1/2} - \alpha_{Ca.Pt+GDL}/\beta_{Ca.Pt+GDL}$$

wherein $\alpha_{Ca.Pt+GDL}$ is a Knudsen flow permeation coefficient of the catalyst layer-gas diffusion layer laminate (A2), $\beta_{Ca.Pt+GDL}$ is a viscous flow permeation coefficient of the catalyst layer-gas diffusion layer laminate (A2), $P_h$ is the pressure of the supplied gas, and F is the permeation rate of the gas penetrating the five-layered membrane-electrode assembly.

The gas permeation rate may be measured at an average pressure, while the gas permeates the five-layered membrane-electrode assembly, and the gas permeation rate may be previously set or be measured on the second side of the five-layered membrane-electrode assembly by a measuring instrument.

Further, the $\alpha_{Ca.Pt+GDL}$ and $\beta_{Ca.Pt+GDL}$ may be calculated by experiments before step of 110 (S110) or steps of 120 and 130 (S120 and S130). The $\alpha_{Ca.Pt+GDL}$ and $\beta_{Ca.Pt+GDL}$ may be calculated by experimental methods or a theoretic method. Particularly, the $\alpha_{Ca.Pt+GDL}$ and $\beta_{Ca.Pt+GDL}$ may be calculated by these two methods, and then may be compared to obtain a final value.

First, the experimental calculation method may use the following Equations:

$$q = \alpha + \beta \cdot P_{av} \quad \text{[Equation 2]}$$

Here, the $P_{av}$ may be calculated by the following Equation 3

$$P_{av} = \frac{P_h + P_l}{2} \quad \text{[Equation 3]}$$

In other words, the $P_{av}$ may be referred to as an average pressure between the first side of the gas diffusion layer or the first side of the catalyst layer-gas diffusion layer laminate (A2) to which single-component inert gas is supplied and the second side of the catalyst layer or the second side of the catalyst layer-gas diffusion layer laminate (A2) from which the supplied single-component is discharged.

The $P_h$ is the pressure of the single-component inert gas supplied to the catalyst layer-gas diffusion layer laminate (A2), and the $P_l$ is the pressure of single-component inert gas discharged from the catalyst layer-gas diffusion layer laminate (A2). The $P_l$ may be a predetermined pressure, for example, atmospheric pressure, or may be a measured pressure value. Further, the F may be a gas permeation rate of the single-component inert gas which may be measured on the second side of the catalyst layer-gas diffusion layer laminate (A2).

Therefore, prior to step 110 (S110) or steps 120 and 130 (S120 and S130), when the gas permeability data with respect to the gas supply pressure at the average pressure, the data which has been obtained by the specimen of another catalyst layer-gas diffusion layer laminate (A2) may be plotted according to the above Equation 2 "$q=\alpha+\beta \cdot P_{av}$", the $\alpha_{Ca.Pt+GDL}$ and $\beta_{Ca.Pt+GDL}$ of the catalyst layer-gas diffusion layer laminate (A2) may be experimentally calculated from the slope of a straight line, and then the gas permeability of the five-layered membrane-electrode assembly, or particularly, the gas permeability of the electrolyte membrane (A1) may be obtained.

The permeation rate of the gas permeating the catalyst layer-gas diffusion layer laminate (A2) may be measured, and the gas permeability of the catalyst layer-gas diffusion layer laminate (A2) may be calculated by dividing the measured gas permeation rate by the difference between the pressure of gas supplied to the catalyst layer-gas diffusion layer laminate (A2) and the pressure of gas discharged from the catalyst layer-gas diffusion layer laminate (A2).

Meanwhile, the $\alpha_{Ca.Pt+GDL}$ and $\beta_{Ca.Pt+GDL}$ may be theoretically calculated by the following Equation 4:

$$\alpha = \frac{[8r]}{[3L(2\pi MRT)^{1/2}]} \frac{\varepsilon}{k_t} \quad \text{[Equation 4]}$$

wherein r is an average pore radius of the gas diffusion layer in meter, L is thickness of the electrolyte membrane (A1) in meter, R is the gas constant of about 8.314 J/mol·k, T is a measured temperature having a unit in K, M is the molecular weight of permeated gas having a unit in kg/mol, $\varepsilon$ is the porosity of the gas diffusion layer, and $k_t$ is the flexibility constant of the pores of the gas diffusion layer. The variables may be obtained by experiments.

Further, the viscous flow permeation coefficient of the gas diffusion layer may be calculated by the following Equation 5:

$$\beta = \frac{[r^2]}{[8L\mu RT]} \frac{\varepsilon}{k_t} \quad \text{[Equation 5]}$$

wherein r is an average pore radius of the gas diffusion layer in meter, L is thickness of the electrolyte membrane (A1) in meter, R is the gas constant of about 8.314 J/mol·k, T is a measured temperature having a unit in K, M is the molecular weight of permeated gas having a unit in kg/mol, $\varepsilon$ is the porosity of the gas diffusion layer, and $k_t$ is the flexibility constant of the pores of the gas diffusion layer. The variables may be obtained by experiments.

The experiments may be repeated to obtain equivalent values of the experimentally calculated $\alpha_{Ca.Pt+GDL}$ and $\beta_{Ca.Pt+GDL}$ values to the theoretically calculated $\alpha_{Ca.Pt+GDL}$ and $\beta_{Ca.Pt+GDL}$ values, such that step 110 (S110) or steps 120 and 130 (S120 and S130) may be performed until final values are calculated.

Meanwhile, in step 140 (S140) after steps 120 and 130 (S120 and S130), the gas permeability, or particularly, the gas permeability of the electrolyte membrane (A1) may be calculated by dividing the gas permeation rate in steps 120 and 130 (S120 and S130) by the difference between the interface pressure ($P_m$) and the outlet pressure ($P_l$). This gas permeability may be determined by the following Equation 6:

$$q_{pem} = \frac{F}{P_m - P_l} \quad \text{[Equation 6]}$$

wherein $q_{pem}$ is the gas permeability of the electrolyte membrane (A1), F is the permeation rate of the gas penetrating the five-layered membrane-electrode assembly at the average pressure $P_{av}=(P_h+P_l)/2$, $P_m$ is the interface pressure, $P_h$ is the gas supply pressure, and $P_l$ is the outlet pressure.

Step 110 (S110) to step 140 (S140) may be repeatedly performed at various predetermined pressures of supplied gas ($P_h$). The gas permeability with respect to each gas supply pressure ($P_h$) may be calculated by repeating experiments, and then the determination step (S150) may be performed.

Hereinafter, the determination step (S150) according to an exemplary embodiment of the present invention will be described. In the determination step (S150), when the gas permeability is maintained at the average pressure of the interface pressure ($P_m$) calculated in step 140 (S140) and predetermined outlet pressure ($P_l$) with the increase in pressure ($P_h$) of single-component inert gas supplied in step 110 (S110), it may be determined that the electrolyte membrane (A1) is a normal state. As the pressure ($P_h$) of the supplied gas increases, the interface pressure ($P_m$) may increase, and the gas permeation rate may also increase due to micropores formed in the electrolyte membrane (A1). Therefore, the gas permeability may be maintained constant regardless of the gas supply pressure ($P_h$), and thus this state may be determined to be a normal state.

Particularly, as the pressure of the supplied single-component inert gas increases, when the calculation result of the gas permeability ($q_{pem}$) to the average pressure ($P_{av}=(P_m+P_l)/2$) in the electrolyte membrane is irrelevant to pressure, or alternatively, when $q_{pem}$ is about 0 or less than about $1.0 \times E^{-10}$, gas migration may not take place due to viscous flow, and only micropores may exist to such a degree that only Knudsen flow may occur but cracks may not exist. Accordingly, the electrolyte membrane may be determined as a normal state which has no defect.

Meanwhile, in the determination step (S150), when the gas permeability increases with the increase of the gas supply pressure, macrocracks greater than microcracks may be formed in the electrolyte membrane (A1). Further, the macrocracks may include cracks, with which the gas permeability may increase with the increase of the gas supply pressure due to substantial increase in size. Alternatively, the macrocracks may include pinholes and cracks having a size similar to that of pinholes.

When the macrocracks are formed in the electrolyte membrane (A1), the gas penetrating the interface between the electrolyte membrane (A1) and the catalyst layer may be easily discharged through the pinholes, and thus the interface pressure ($P_m$) may be equivalent to the outlet pressure ($P_l$). However, with the increase of the gas supply pressure ($P_h$) and the supply amount of gas, the permeation rate of the gas continuously may increase, and thus the gas permeability may gradually increase. Accordingly, it may be determined that macrocracks are formed in the electrolyte membrane (A1).

Particularly, as the supply pressure of the single-component inert gas increases, when the gas permeability of the electrolyte membrane which is calculated by Equation 6 above increases depending on the measured pressure, defects such as pinholes may exist in the electrolyte membrane, and thus most of the gas may transfer through the defective portions such as pinholes. Consequently, as the gas supply pressure ($P_h$) increases, the interface pressure ($P_m$) may be extremely reduced to such a degree that the interface pressure ($P_m$) may be approximately equal to the outlet pressure ($P_l$), and thus $P_m-P_l$ may be about zero. However, on the other hand, the gas permeation rate (F) may rapidly increased by a viscous flow effect in contrast to the case when the electrolyte membrane has no defect, and thus it may be determined that cracks greater than microcracks are formed in the electrolyte membrane.

Meanwhile, in the determination step (S150), when the gas permeability calculated in step 140 (S140) decreases with the increase of the gas supply pressure, it may be determined that microcracks are formed in the electrolyte membrane (A1).

When microcracks are formed in the electrolyte membrane (A1), the gas permeation rate may not increase in proportion to the increase of the gas supply pressure ($P_h$) and the amount of supplied gas, but may increase at a predetermined ratio. Therefore, as the gas supply pressure ($P_h$) increases, the interface pressure ($P_m$) may also increase, and the increase rate of the gas permeation rate may be reduced. Accordingly, the gas permeability may gradually decrease.

Particularly, as the pressure of the supplied single-component inert gas increases, when the gas permeability ($q_{pem}$) of the electrolyte membrane which is calculated by Equation 6 decreases depending on the measured pressure, defects may be substantially little, and thus the increase of F may be less than the increase of pressure difference ($P_m-P_l$) depending on the increase of measured pressure ($P_h$), unlike in Equation 6. Accordingly, it may be determined that microcracks are formed in the electrolyte membrane when the calculated gas permeability decreases.

FIG. 3 is an exemplary graph showing permeabilities when macrocracks, normal state and microcracks are formed in the electrolyte membrane. In FIG. 3, the horizontal axis indicates the average pressure ($P_a$) of the interface pressure ($P_m$) and the outlet pressure ($P_l$), and vertical axis indicates the gas permeability according to the average pressure ($P_a$).

In the graph of FIG. 3, when macrocracks are formed (line B2), the slope is greater than 0; when microcracks are formed (line B3), the slope is less than 0; and in a normal state (lineB1), the slope is about 0 or less than $1.0 \times E^{-10}$. As such, when the slope is arithmetically calculated by average pressure and gas permeability, the occurrence and state of cracks in the electrolyte membrane (A1) may be determined.

In another aspect, an apparatus for detecting the defects of a five-layered membrane-electrode assembly 200 is provided. The apparatus may include: a three-layered membrane-electrode assembly 210 and gas diffusion layers 220 attached to both sides of the three-layered membrane-electrode assembly 210 according to an exemplary embodiment of the present invention. The apparatus may further include: a pressing unit 100 supplying gas to a first side of the five-layered membrane-electrode assembly 200; a detection unit 300 detecting the permeation rate of the gas permeating to a second side of the five-layered membrane-electrode assembly 200; and a control unit 400 calculating an interface pressure between the electrolyte membrane of the three-layered membrane-electrode assembly 210 and a catalyst layer-gas diffusion layer laminate including the catalyst layers of the three-layered membrane-electrode assembly 210 using the pressure of the supplied gas by the pressing unit 100 and the gas permeation rate detected by the detection unit 300, calculating the gas permeability of the electrolyte membrane using a predetermined outlet pressure at the second side of the five-layered membrane-electrode assembly 200, the detected gas permeation rate and the calculated interface pressure, and determining a defect state of the electrolyte membrane using variation in the calculated gas permeability according to the change in the gas supply pressure.

In an exemplary apparatus, the gas may be an inert gas including nitrogen inert which does not react with other substances and the gas may further include other six noble gases, such as helium and the like belonging to group 18 elements on the periodic table, such that flow errors may not occur by preventing the gas from being adsorbed on the wall of pores formed in the electrolyte membrane of the five-layered membrane-electrode assembly. A plurality of the pressing units 100 may be provided, and the plurality of the pressing units 100 may supply gas at differently set pressures. The plurality of the pressing units 100 may be independently operated such that predetermined pressure gas may be supplied. The control unit 400 may determine the defect state of the electrolyte membrane by calculating the gas permeability corresponding to the pressure of gas supplied by each of the pressing units 100 to evaluate the slope of the gas permeability according to the average pressure. The method of operating the control unit 400 is described above.

In addition, the control unit 400 may use the gas permeability as a factor for identifying defects after the pressure of the gas is changed, or after any one of the plurality of pressing units 100 supplies gas. This factor may be used for the purpose of increasing the accuracy of determination by using the stabilised gas permeability value of the gas permeability values measured during the supply of gas.

Further, the control unit 400 may output the determined results through an additional output device.

As described above, according to various exemplary methods and apparatuses for detecting defects of a fuel cell membrane-electrode assembly, occurrence and state of defects such as pinholes of several tens to several hundreds of nanometers of an electrolyte membrane in a membrane-electrode assembly of a fuel cell may be detected, and thus a membrane-electrode having high possibility of becoming defective may be detected and removed properly, thereby assuring cell voltage stability during manufacturing a fuel cell stack and improving the durability of a fuel cell.

Further, according to various embodiment of the present invention, combustion reaction of hydrogen and oxygen, which may be caused by the enormous defects such as pinholes, may be suppressed, thus preventing the damage of a fuel cell.

Further, according to various exemplary methods and apparatuses in the present invention, each value may be experimentally obtained and be numerically calculated, occurrence of defects over the entire electrolyte membrane in the membrane-electrode assembly may be detected.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of detecting defects of a fuel cell membrane-electrode assembly which comprises a gas diffusion layer, a catalyst layer and an electrolyte membrane, comprising steps of:
supplying gas to a first side of the membrane-electrode assembly;
deducing a pressure of the supplied gas and a permeation rate of a permeated gas to a second side of the membrane-electrode assembly, and then deducing an interface pressure between the electrolyte membrane and the gas diffusion layer of the membrane-electrode assembly using the deduced pressure of the supplied gas and the permeation rate;
calculating a gas permeability of the electrolyte membrane using the permeation rate, the deduced interface pressure and a predetermined outlet pressure at the second side of the membrane-electrode assembly; and
determining a defect state of the electrolyte membrane using a variation in the calculated gas permeability according to a change in the pressure of the supplied gas.

2. The method of claim 1, wherein the interface pressure ($P_m$) is calculated by the following Equation:

$$P_m = \{(\alpha_{Ca.Pt+GDL}/\beta_{Ca.Pt+GDL})^2 + 2P_h(\alpha_{Ca.Pt+GDL}/\beta_{Ca.Pt+GDL}) + P_h^2 - 2F/\beta_{Ca.Pt+GDL}\}^{1/2} - \alpha_{Ca.Pt+GDL}/\beta_{Ca.Pt+GDL}$$

wherein $\alpha_{Ca.Pt+GDL}$ is a Knudsen flow permeation coefficient of the gas diffusion layer, $\beta_{Ca.Pt+GDL}$ is a viscous flow permeation coefficient of the gas diffusion layer, $P_h$ is the pressure of the supplied gas, and F is a gas permeation rate.

3. The method of claim 2, wherein the interface pressure is the pressure of the supplied gas at an interface between the electrolyte membrane and the catalyst layer.

4. The method of claim 2, wherein the Knudsen flow permeation coefficient of the gas diffusion layer is calculated by the following Equation:

$$\alpha = \frac{[8r]}{[3L(2\pi MRT)^{1/2}]} \frac{\varepsilon}{k_t}$$

wherein r is an average pore radius in meter; L is a thickness of the electrolyte membrane in meter; R is a gas constant of about 8.314 J/mol·k; T is a measured temperature in K; M is a molecular weight of the permeated gas in kg/mol; $\varepsilon$ is a porosity of the gas diffusion layer; and $k_t$ is a flexibility constant of the pores of the gas diffusion layer.

5. The method of claim 2, wherein the viscous flow permeation coefficient of the gas diffusion layer is calculated by the following Equation:

$$\beta = \frac{[r^2]}{[8L\mu RT]} \frac{\varepsilon}{k_t}$$

wherein r is an average pore radius in meter; L is a thickness of the electrolyte membrane in meter; R is a gas constant of about 8.314 J/mol·k; T is a measured temperature in K; M is a molecular weight of the permeated gas in kg/mol; $\varepsilon$ is a porosity of the gas diffusion layer; and $k_t$ is a flexibility constant of the pores of the gas diffusion layer.

6. The method of claim 2, wherein the Knudsen flow permeation coefficient of the gas diffusion layer and the viscous flow permeation coefficient of the gas diffusion layer are experimentally deduced from an intercept of a straight line when the gas is supplied to the first side of a catalyst layer-gas diffusion layer laminate and then a gas permeability of the catalyst layer-gas diffusion layer laminate is plotted by the Equation $q=\alpha+\beta \cdot P_{av}$ at an average pressure of pressure of a gas discharged from the catalyst layer-gas diffusion layer laminate and pressure of the supplied gas.

7. The method of claim 6, wherein a gas permeation rate of the gas permeating the catalyst layer-gas diffusion layer laminate is detected, and the gas permeability of the catalyst layer-gas diffusion layer laminate is calculated by dividing the detected gas permeation rate by a difference between the pressure of the gas supplied to the catalyst layer-gas diffusion layer laminate and the pressure of the gas discharged from the catalyst layer-gas diffusion layer laminate.

8. The method of claim 1, wherein the gas permeation rate is detected by a detection unit.

9. The method of claim 1, wherein the gas permeability is calculated by dividing the deduced gas permeation rate by the difference between the interface pressure and the predetermined outlet pressure.

10. The method of claim 1, wherein the gas permeation rate and the gas permeability are deduced at an average pressure while the gas permeates the membrane-electrode assembly.

11. The method of claim 1, wherein the electrolyte membrane is determined as a normal state when the gas permeability calculated during the step of supplying the gas is maintained at a predetermined value as the pressure of the supplied gas increases.

12. The method of claim 1, wherein it is determined that macrocracks greater than microcracks are formed in the electrolyte membrane when the calculated gas permeability increase as the pressure of the supplied gas by plotting against each arithmetic mean pressure between the interface pressure ($P_m$) and the outlet pressure ($P_1$).

13. The method of claim 1, wherein it is determined that microcracks are formed in the electrolyte membrane when the pressure of the supplied gas increases and the calculated gas permeability decreases by plotting against each arithmetic mean pressure between the interface pressure ($P_m$) and the outlet pressure ($P_1$).

14. An apparatus for detecting defects of a fuel cell membrane-electrode assembly which comprises a membrane-electrode assembly and a gas diffusion layer attached to the membrane-electrode assembly, comprising:
 a pressing unit supplying gas to a first side of the membrane-electrode assembly;
 a detection unit detecting a gas permeation rate of the gas permeating to a second side of the membrane-electrode assembly; and
 a control unit calculating an interface pressure between the electrolyte membrane and gas diffusion layer of the membrane-electrode assembly using the pressure of the supplied gas by the pressing unit and the gas permeation rate detected by the detection unit, calculating gas permeability of the electrolyte membrane using a predetermined outlet pressure at the second side of the membrane-electrode assembly, the detected gas permeation rate and the calculated interface pressure, and determining a defect state of the electrolyte membrane using a variation in the calculated gas permeability according to a change in the pressure of the supplied.

15. The apparatus of claim 14, wherein the gas is an inert gas including nitrogen or helium such that a flow error does not occur by preventing the gas from being adsorbed on the wall of pores formed in the electrolyte membrane of the membrane-electrode assembly.

16. The apparatus of claim 14, wherein a plurality of the pressing units are provided, and the plurality of the pressing units supply gas at differently set pressures.

17. The apparatus of claim 14, wherein the control unit uses the gas permeability as a factor for identifying defects after a predetermined period has passed since the pressure of the supplied gas is changed.

* * * * *